(12) United States Patent
Vollmer

(10) Patent No.: US 9,288,871 B2
(45) Date of Patent: Mar. 15, 2016

(54) ACTUATION OF A LIGHTING MODULE

(75) Inventor: Ralf Vollmer, Ulm (DE)

(73) Assignee: OSRAM GmbH, Munich (DE)

( * ) Notice: Subject to any disclaimer, the term of this patent is extended or adjusted under 35 U.S.C. 154(b) by 430 days.

(21) Appl. No.: 13/811,648

(22) PCT Filed: Jun. 28, 2011

(86) PCT No.: PCT/EP2011/060850
§ 371 (c)(1),
(2), (4) Date: Jan. 22, 2013

(87) PCT Pub. No.: WO2012/010388
PCT Pub. Date: Jan. 26, 2012

(65) Prior Publication Data
US 2013/0119861 A1    May 16, 2013

(30) Foreign Application Priority Data
Jul. 21, 2010 (DE) .......................... 10 2010 031 590

(51) Int. Cl.
*H05B 37/00* (2006.01)
*H05B 37/02* (2006.01)
*H05B 33/08* (2006.01)
*B60Q 1/00* (2006.01)

(52) U.S. Cl.
CPC ............. *H05B 37/02* (2013.01); *B60Q 1/0088* (2013.01); *H05B 33/0824* (2013.01); *H05B 33/0845* (2013.01)

(58) Field of Classification Search
CPC ............. H05B 33/0815; H05B 33/083; H05B 33/0839; H05B 33/0845
USPC ............... 315/185 R, 186, 193; 327/108, 109
See application file for complete search history.

(56) References Cited

U.S. PATENT DOCUMENTS

| | | | |
|---|---|---|---|
| 6,486,726 B1 * | 11/2002 | Worley et al. ................ | 327/514 |
| 6,980,181 B2 | 12/2005 | Sudo | |
| 7,009,580 B2 | 3/2006 | Leung | |
| 8,299,724 B2 * | 10/2012 | Huynh .......................... | 315/291 |
| 2002/0105373 A1 | 8/2002 | Sudo | |
| 2003/0164809 A1 | 9/2003 | Leung | |
| 2005/0243022 A1 * | 11/2005 | Negru ............................ | 345/46 |
| 2008/0001547 A1 * | 1/2008 | Negru ............................ | 315/189 |
| 2008/0116818 A1 | 5/2008 | Shteynberg et al. | |
| 2008/0122383 A1 | 5/2008 | Katoh | |
| 2015/0108909 A1 * | 4/2015 | Rupp ................... | H05B 33/083 315/188 |

FOREIGN PATENT DOCUMENTS

| | | |
|---|---|---|
| CN | 101193484 | 6/2008 |
| DE | 44 20 589 | 3/1995 |
| DE | 10 2006 024 607 | 11/2007 |
| DE | 10 2007 041 131 | 3/2009 |
| JP | 2004-119422 | 4/2004 |
| JP | 2008-134288 | 6/2008 |
| JP | 2009-283775 | 12/2009 |
| KR | 10-2010-0019503 | 2/2010 |

* cited by examiner

*Primary Examiner* — William Hernandez
(74) *Attorney, Agent, or Firm* — Cozen O'Connor

(57) ABSTRACT

A circuit for actuating a lighting module, comprising at least two semiconductor light-emitting elements (D1, D2) which are connected in series in a first operating mode; wherein, in the event of a predetermined threshold value for an operating voltage (101) being undershot, a second operating mode is detectable (102); and wherein, in the second operating mode, the at least two semiconductor light-emitting elements (D1, D2) are alternately actuable.

9 Claims, 1 Drawing Sheet

ACTUATION OF A LIGHTING MODULE

RELATED APPLICATIONS

This is a U.S. National Phase Application under 35 USC 371 of International Application PCT/EP2011/060850 filed on Jun. 28, 2011.

This application claims the priority of German application no. 10 2010 031 590.7 filed Jul. 21, 2010, the entire content of which is hereby incorporated by reference.

FIELD OF THE INVENTION

The invention relates to a circuit and a method for actuating a lighting module.

BACKGROUND OF THE INVENTION

Light sources, as are used in a vehicle, for example, require a certain operating voltage range. Thus, for example, a voltage in a range of from 8 V to 16 V enables the operation of a light source at full brightness. Furthermore, however, operation of the light source at reduced brightness in a voltage range of from 6 V to 8 V may also be required.

In the case of the series circuit of a plurality of light-emitting diodes (LEDs), a forward voltage is typically between 6 V and 8 V. In order to adjust this forward voltage, a step-down converter can be used, starting from the operating voltage mentioned by way of example in the range of from 8 V to 16 V.

However it is problematic that such a series circuit of LEDs already illuminates at insufficient brightness at an operating voltage of 6 V, for example. The reason for this consists in that the luminous flux of the light-emitting diode is already too low at an operating voltage of 6 V owing to the exponential diode characteristic in conjunction with the mentioned step-down converter. In such a case, i.e. during operation of the light-emitting diode with reduced brightness at the predetermined operating voltage of 6 V, a step-up converter could be provided in order to raise the operating voltage again such that the light-emitting diode illuminates with sufficient brightness. Instead of the above-mentioned step-down converter, a step-up converter could therefore be used. In this case, it is disadvantageous that such a measure increases the cost of the operating device of the light source and also increases the size thereof owing to the additionally required component parts.

SUMMARY OF THE INVENTION

One object of the invention is to avoid the above-mentioned disadvantages and, in particular, to provide an efficient solution for being able to operate a light source with a plurality of LEDs with reduced brightness even at low operating voltages.

This and other objects are attained in accordance with one aspect of the invention directed to a circuit for actuating a lighting module,
comprising at least two semiconductor light-emitting elements which are connected in series in a first operating mode;
in which, in the event of a predetermined threshold value for an operating voltage being undershot, a second operating mode is detectable;
in which, in the second operating mode, the at least two semiconductor light-emitting elements are alternately actuable.

In particular, the semiconductor light-emitting module can be a light-emitting diode (LED).

The first operating mode corresponds to operation of the lighting module at full brightness, for example, and the second operating mode can correspond to operation of the lighting module at a reduced brightness.

By virtue of the alternate actuation of the at least two semiconductor light-emitting elements, in each case some of the semiconductor light-emitting elements are switched off, the operating voltage is matched for operation of the currently active semiconductor light-emitting elements, for example by means of a step-down converter. As a result, it is advantageously possible to achieve a situation in which, in the second operating mode, the active semiconductor light-emitting elements are operated at their energy-efficient working point and, at the same time, the lighting module overall illuminates at reduced brightness because some of the semiconductor light-emitting elements are inactive. Owing to a sufficiently rapid change between the switching states, it is possible to achieve a situation in which the human eye perceives uniform reduced brightness.

Thus, the lighting module is operated in two operating modes advantageously with only one step-down converter, wherein the second operating mode enables a reduced brightness of the lighting module given efficient actuation of the semiconductor light-emitting elements.

A development consists in that depending on the level of the operating voltage, the first operating mode or the second operating mode can be set.

In particular, the threshold value being overshot can be detected and therefore the first operating mode can be (re) activated.

Another development consists in that the at least two semiconductor light-emitting elements are actuable alternately or alternately in groups.

In particular, the plurality of semiconductor light-emitting elements can be grouped in series circuits, with these groups being activated alternately. At least one semiconductor light-emitting element can be provided per group.

In particular, a development consists in that the at least two semiconductor light-emitting elements are alternately actuable by means of
a bistable multivibrator;
a counter;
a shift register;
a microcontroller or microprocessor.

Another development consists in that the at least two semiconductor light-emitting elements are alternately actuable at a frequency which is so high that no flicker can be perceived by the human eye.

For example, a switching or clock frequency of at least 65 Hz can be set for switchover.

In addition, a development consists in that the circuit has a step-down converter, with the aid of which
in the first operating mode, a supply voltage can be set for the series circuit comprising the at least two semiconductor light-emitting elements;
in the second operating mode, the supply voltage can be set for some of the at least two semiconductor light-emitting elements.

This advantageously means that the step-down converter provides the supply voltage required correspondingly for part of the series circuit of semiconductor light-emitting elements. Thus, the alternately active semiconductor light-emitting elements can be operated at their energy-efficient working point via the step-down converter.

As a result of the fact that, in the second operating mode, only some of the at least two semiconductor light-emitting elements are active at any point in time, only a reduced supply voltage for this active part of the semiconductor light-emitting elements is also required. Therefore, a step-up converter can be dispensed with and regulation of the supply voltage is possible for both operating modes with the step-down converter.

Another development consists in that the circuit is used for operating a light source, in particular a light source for a vehicle.

Another aspect of the invention is directed to a method for actuating a lighting module,
wherein the lighting module comprises at least two semiconductor light-emitting elements,
in which the at least two semiconductor light-emitting elements are connected in series in a first operating mode;
in which, in the event of a predetermined threshold value for an operating voltage being undershot, a second operating mode is detected and, in the second operating mode, the at least two semiconductor light-emitting elements are alternately actuated.

As has already been mentioned, the at least two semiconductor light-emitting elements can be actuated individually or in groups alternately. Preferably, in this case each group has a series circuit of semiconductor light-emitting elements.

The above statements apply correspondingly also to the method for actuating the lighting module.

Furthermore, the abovementioned object is achieved by means of a light source comprising the circuit described here. In particular, the light source may be a light source for a vehicle (for example headlamp, fog light, reversing light, etc.).

BRIEF DESCRIPTION OF THE DRAWINGS

Exemplary embodiments of the invention will be illustrated and explained below with reference to the drawings, in which:

DETAILED DESCRIPTION OF THE DRAWINGS

Figure 1A:
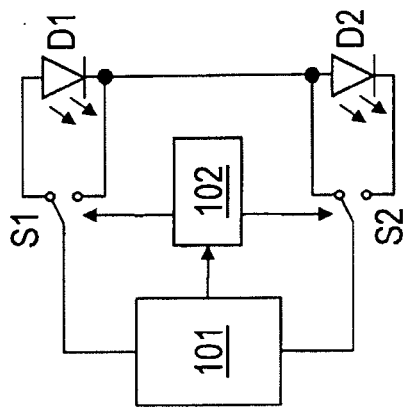
Figure 1B:
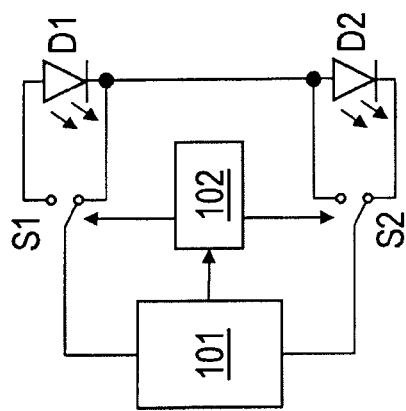

FIG. 1A shows a schematic block circuit diagram in a first operating mode, in which an operating voltage is greater than a predetermined threshold value and a series circuit of a first and a second light-emitting diode is connected to the operating voltage;
FIG. 1B shows, on the basis of the illustration shown in FIG. 1A, a switching state of a second operating mode, in which only the second light-emitting diode is active;
FIG. 1O shows, on the basis of the illustration shown in FIG. 1A, a switching state of the second operating mode, in which only the first light-emitting diode is active.

Preferably, a lighting module has a plurality of semiconductor light-emitting elements, which can be operated in particular at least partially as a series circuit. The semiconductor light-emitting element may be a light-emitting diode. It is also possible for the light-emitting diode to have a semiconductor light-emitting element or a plurality of semiconductor light-emitting elements.

In a first operating mode, the lighting module is supplied with a fully operating voltage, and the semiconductor light-emitting elements are connected in series. In particular, the efficiency of an operating device or driver for operating the lighting module can be optimized for the first operating mode.

In a second operating mode, the lighting module is intended to illuminate at reduced brightness. This operating mode is identified when the operating voltage drops below a predetermined threshold value. In this case, parts of the series circuit are supplied alternately with the (reduced) operating voltage, i.e. for a specific period of time in each case only some of the semiconductor light-emitting elements.

For example, in the case of a series circuit comprising two LEDs, in the second operating mode alternately in each case one LED is connected to the operating voltage. A step-down converter, which also ensures the supply of the appropriate voltage to the lighting module for the first operating mode, in this case regulates the supply voltage in such a way that only one light-emitting diode is operated. Owing to the alternate switching to and fro between the light-emitting diodes, only one light-emitting diode is active, and the other light-emitting diode is voltage-free. The switching between the light-emitting diodes preferably takes place at a frequency which is dimensioned such that flicker cannot be perceived by the human eye.

In this case, it is advantageous that by virtue of sufficiently rapid alternate switching between the light-emitting diodes, to the human eye the impression is created of a light source which illuminates over the full area at reduced brightness (in comparison with the first operating mode).

Correspondingly, a plurality of semiconductor light-emitting elements can be provided which are driven individually (in sequence). It is also possible for a plurality of semiconductor light-emitting elements to be actuated in grouped fashion, i.e. together, in the second operating mode.

In order to implement the second operating mode, control electronics are preferably provided which detect a low operating voltage and therefore identify the second operating mode. Thereupon, alternate actuation of the semiconductor light-emitting elements (individually or in groups) with the full operating current takes place. Correspondingly, the control electronics can identify the full operating voltage and correspondingly activate the first operating mode, in which the series circuit of the semiconductor light-emitting elements of the lighting module are connected to the operating voltage.

It is advantageous here that there is no need for a more complex step-up converter, but a favourably embodied step-down converter is sufficient and nevertheless the light distribution remains unchanged under different use conditions. The brightness of the lighting module is rather reduced in an efficient manner.

FIG. 1A shows a schematic block circuit diagram in a first operating mode, in which an operating voltage 101 is greater than a predetermined threshold value. A lighting module comprises two light-emitting diodes D1, D2. In addition, two switches S1, S2 are provided, for example two electronically actuable switches (transistors, MOSFETs or the like). If, therefore, the operating voltage 101 is greater than the predetermined threshold value, the series circuit comprising the light-emitting diodes D1, D2 is connected to the operating voltage 101 via the switches S1, S2.

For example, a control unit 102 can be provided which has a comparator circuit, with the aid of which the operating voltage 101 can be evaluated. Depending on this evaluation, the electronic switches S1, S2 are actuated correspondingly by the control unit 102.

Figure 1C:
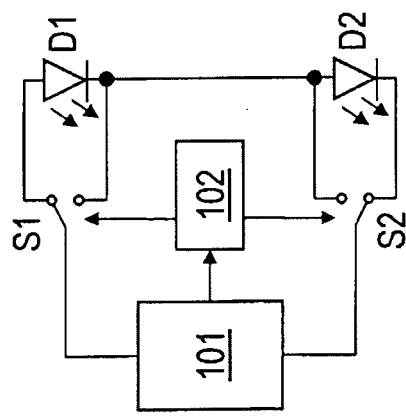

If the operating voltage 101 undershoots the predetermined threshold value, this event is identified by the control unit 102 and in each case one of the light-emitting diodes D2 (see FIG. 1B) and D1 (see FIG. 1C) is connected alternately to the operating voltage. Correspondingly, the control unit 102 has the possibility of switching to and fro between the positions of the electronic switches S1 and S2 shown in FIG. 1B and FIG. 1C. This can be achieved, for example, by means of a multivibrator (for example an astable multivibrator). The switchover frequency is preferably above a frequency which can be perceived as flicker by the human eye. For example, this frequency is in a range of between 65 Hz and 100 KHz. The control unit can be implemented with few component parts discretely and/or in combination with an integrated circuit (for example TLC555). It is also possible for a microcontroller or a microprocessor to perform the function of identification of the supply voltage 101 and/or actuation of the switches S1, S2.

In addition, reference is made to the fact that the unit 101 shown in the figures is denoted symbolically as "supply voltage" and in particular provides a value for the supply voltage of the control unit 102. In addition, the unit 101 can include the mentioned step-down converter, which matches the reduced supply voltage corresponding to the voltage level required for the operation of an individual light-emitting diode. The step-down converter can also be implemented separately, for example as part of the control unit 102.

In particular, it is noted that the lighting module can comprise a plurality of semiconductor light-emitting elements, in particular a plurality of light-emitting diodes. The series circuit explained by way of example here can also drive in each case more than one light-emitting diode (i.e. some of the light-emitting diodes connected in series) depending for example on the level of the available supply voltage in the second operating mode. For example, analogously to the example shown in FIG. 1A, the lighting module could comprise a series circuit comprising six light-emitting diodes and, in the second operating mode shown in FIG. 1B, the first two light-emitting diodes (connected in series) are actuated, and in the second operating mode shown in FIG. 1C, the second two light-emitting diodes (connected in series) are actuated and furthermore, even in accordance with the second operating mode, there is a third subcycle, in which the last two light-emitting diodes (connected in series) are actuated.

In this case, the control unit 102 produces an alternating cycle between three switching states, with in each case two of the six light-emitting diodes being connected to the operating voltage. Preferably, in this case a further switching plane is provided for the switches S1, S2, with the result that in each case only two of the six light-emitting diodes can be connected to the operating voltage in each cycle of the second operating mode.

The switchover between the switching states can take place, for example, by means of a timer module or a shift register, wherein the switch between three states is iterative and one switch position of the electronic switches is implemented per state. In particular, this functionality can be programmed in an integrated circuit, for example a microcontroller.

The circuit proposed here can be used, for example, for operating a light source of a vehicle, for example a blinker, a fog light, or the like.

The invention claimed is:

1. A circuit for actuating a lighting module, comprising at least two semiconductor light-emitting elements, the circuit being configured so that said at least two semiconductor light-emitting elements are connected in series in a first operating mode and wherein, in the event of a predetermined threshold value for an operating voltage being undershot, a second operating mode is detected;

wherein, in the second operating mode, the at least two semiconductor light-emitting elements are alternately actuated at a frequency in a range of between 65 Hz and 100 KHz so that no flicker can be perceived by the human eye.

2. The circuit as claimed in claim 1, wherein, depending on the level of the operating voltage, the first operating mode or the second operating mode is set.

3. The circuit as claimed in claim 1, wherein the at least two semiconductor light-emitting elements are actuated alternately in groups.

4. The circuit as claimed in claim 1, wherein the at least two semiconductor light-emitting elements are alternately actuated by a bistable multivibrator;

a counter;

a shift register;

a microcontroller or microprocessor.

5. The circuit as claimed in claim 1 for operating a light source, in particular a light source for a vehicle.

6. A light source comprising the circuit as claimed in claim 1.

7. The light source as claimed in claim 6, wherein the light source is a light source for a vehicle.

8. A circuit for actuating a lighting module, comprising at least two semiconductor light-emitting elements; wherein the circuit has a step-down converter and is configured so that said at least two semiconductor light-emitting elements are connected in series in a first operating mode and in the event of a predetermined threshold value for an operating voltage being undershot, a second operating mode is detected;

wherein, in the second operating mode, the at least two semiconductor light-emitting elements are alternately actuated at a frequency in a range of between 65 Hz and 100 KHz, and wherein with the aid of said step-down converter:

in the first operating mode, a supply voltage is set for the series circuit comprising the at least two semiconductor light-emitting elements; and in the second operating mode, the supply voltage is set for some of the at least two semiconductor light-emitting elements.

9. A method for actuating a lighting module, wherein the lighting module comprises at least two semiconductor light-emitting elements, wherein the at least two semiconductor light-emitting elements are connected in series in a first operating mode; and wherein, in the event of a predetermined threshold value for an operating voltage being undershot, a second operating mode is detected and, in the second operating mode, the at least two semiconductor light-emitting elements are alternately actuated at a frequency in a range of between 65 Hz and 100 KHz so that no flicker can be perceived by the human eye.

* * * * *